(12) United States Patent
Uchida

(10) Patent No.: US 6,339,196 B1
(45) Date of Patent: Jan. 15, 2002

(54) GROMMET

(75) Inventor: Yoshimi Uchida, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/516,932

(22) Filed: Mar. 1, 2000

(30) Foreign Application Priority Data

Mar. 2, 1999 (JP) .............................. 11-054703

(51) Int. Cl.$^7$ .............................................. H01B 17/26
(52) U.S. Cl. ..................... 174/153 G; 16/2.1; 248/56
(58) Field of Search ............................. 174/31 R, 65 R, 174/65 G, 152 G, 152 R, 153 G, 167; 16/2.1, 2.2; 248/56

(56) References Cited

U.S. PATENT DOCUMENTS

| | | | | |
|---|---|---|---|---|
| 2,668,316 A | * | 2/1954 | Sturtevant et al. ............. | 16/2.2 |
| 3,518,359 A | * | 6/1970 | Trimble et al. .......... | 174/153 G |
| 5,526,549 A | | 6/1996 | Mori et al. ........................ | 16/2 |
| 5,701,634 A | * | 12/1997 | Uemura et al. ................ | 16/2.1 |
| 5,836,048 A | * | 11/1998 | Rossman et al. ............... | 16/2.2 |
| 5,856,635 A | * | 1/1999 | Fujisawa et al. ......... | 174/153 G |
| 5,981,877 A | | 11/1999 | Sakata et al. ............ | 174/153 G |
| 6,051,795 A | * | 4/2000 | Fisher et al. ............. | 174/153 G |
| 6,058,562 A | | 5/2000 | Satou et al. .................... | 16/2.1 |
| 6,088,876 A | * | 7/2000 | Dauod ........................... | 16/2.2 |

FOREIGN PATENT DOCUMENTS

| | | | | |
|---|---|---|---|---|
| JP | 4-249817 | 9/1992 | | |
| JP | 406165347 A | * 6/1994 | ............. | 174/153 G |
| JP | 7-14452 | 1/1995 | | |
| JP | 9-219123 | 8/1997 | | |
| JP | 10116531 | 5/1998 | | |

* cited by examiner

*Primary Examiner*—Dean A. Reichard
*Assistant Examiner*—Adolfo Nino
(74) *Attorney, Agent, or Firm*—Greenblum & Bernstein, P.L.C.

(57) ABSTRACT

The present invention is directed to a grommet that engages around an outer periphery of a wire harness and is inserted into a through hole of the automobile body. The grommet is provided with a generally cylindrical portion that tightly engages a wire of the wire harness and a generally conical portion extending from one end of the cylindrical portion. A thickened portion is provided around the conical portion in an enlarged end. A recess configured to be engaged with the automobile body is provided on an outer peripheral surface of the thickened portion. One side wall of the recess in the enlarged end extends outwardly and has a lip projecting from a tip of the extended side wall. A bottom surface of the recess has either a curved portion or an inclined portion so that an edge of the through hole of the automobile body panel is forcefully pressed into and distorts the curved or inclined portion. Another side wall, which faces toward the lip-side side wall (extending side wall), is configured to approach the lip-side side wall along a direction from the bottom surface to an opening end of the recess. The automobile body panel, which is engaged with the inner surface of the recess, contacts the grommet at the curved portion or the inclined portion of the recess, as well as the side wall and the lip. Thus, plural sealing points are provided between the grommet and an automobile body panel, thus, waterproofness is improved.

16 Claims, 7 Drawing Sheets

GROMMET

BACKGROUND OF THE INVENTION

1. Field of Invention

This invention relates to a grommet that engages around an outer periphery of a wire harness for an automobile and is mounted in a through hole of an automobile body panel. In particular, this invention improves seal efficiencies by providing plural contact points between the automobile body panel and the grommet.

2. Description of Related Art

Conventionally, when a wire harness for an automobile is inserted into a through hole provided in an automobile body panel that divides an engine compartment and a passenger compartment, in order to wire the wire harness, the wire harness is inserted into a grommet which is made of a rubber. The grommet is provided with a generally conical (convex) portion with a recess for engaging with the automobile body and a small-diameter cylindrical portion that extends from the tip end of the conical portion and tightly engages around an outer peripheral surface of the wire harness. Then, the grommet with the wire harness is mounted in the through hole. The recess for engaging with the automobile body contacts the edge of the through hole of the automobile body panel to prevent water intrusion from the through hole.

When a burring is not protrusively provided around the through hole of the automobile body panel, a grommet 1 as shown in FIGS. 6(A)–6(C) is used. The grommet 1 is provided with a small-diameter cylindrical portion 1a to tightly cover a wire harness, a generally conical portion 1b extending from one end of the small-diameter cylindrical portion 1a. A conical portion has a thickened portion around an enlarged end of the conical portion. The recess 1c for engaging with an automobile body panel is provided on an outer periphery of the thickened portion. One side wall 1g of the recess in the enlarged end of the conical portion extends outwardly and a lip 1d is provided on the tip of the extending side wall.

A width W1 of the recess 1c (the distance between side walls 1f and 1g) is defined to be slightly larger than a panel thickness W2 of an automobile body panel 2 to make the grommet easier to mount on the automobile body panel and to provide versatility such that the grommet can be used with an automobile body panel having a variety of the panel thicknesses W2. As described above, the lip 1d is provided and pressed against the automobile body panel 2. Further, the diameter D1 of the grommet around the bottom surface 1e of the recess 1c is defined such that an entire inner peripheral surface 2a-2 of the through hole 2a contacts the bottom surface 1e of the recess 1e. In other words, the diameter D1 is defined to be at least as large as the diameter D2 of the through hole 2. More specifically, when D2 is 55 mm, D1 is set to be about 55 mm plus 0 mm to 0.3 mm.

Thus, to secure a seal efficiency, the recess 1c of the grommet 1 and the automobile body panel 2 which engages with the inner surface of the recess 1c, contact each other at three points P1, P2 and P3 as shown in FIG. 6(C). In other words, the entire inner peripheral surface 2a-2 of the through hole 2a contacts the bottom surface 1e of the recess 1c at P1, the lip 1d contacts panel 2 at P2, and the automobile body panel 2 is pressed against the side wall 1f of the recess 1c at P3 by the lip 1d.

However, as shown in FIG. 7, for example, when a wire harness fitted with the above-described grommet is inserted into the through hole 2a from an engine compartment side (X) to a passenger compartment side (Y), the wire harness is often forced to bend in the engine compartment side (X). Thus, when the wire harness W/H is bent, the grommet 1, which is fixed to the wire harness by taping at the small-diameter cylindrical portion 1a, is also forced to bend. Therefore, at a side opposite to the bending direction ((Z) in FIG. 7), as shown in FIG. 8, the inner peripheral surface 2a-2 of the through hole 2a becomes separated from the bottom surface 1e of the recess 1c. In addition, the side wall 1f on the small-diameter cylindrical portion side is pulled and is sometimes separated from the automobile body panel 2. Thus, only the lip 1d contacts the automobile body panel 2, and the original three contact points for sealing are reduced to one. As a result, water can easily enter the passenger compartment side (Y) and, in the worst case, water does intrude into the passenger compartment side (Y).

Accordingly, the present invention is provided to overcome the above-described problems. The objective of the present invention is to provide a grommet that contacts the automobile body panel at plural points instead of only one sealing point in the lip and thus ensures waterproofness, even when the grommet is pulled in a direction due to bending of the wire harness.

SUMMARY OF THE INVENTION

To achieve the above and other goals, the present invention provides a grommet that engages around an outer periphery of a wire harness and is mounted on a through hole of an automobile body panel without burring. The grommet of the present invention includes a generally cylindrical portion that tightly covers wires of the wire harness. A generally conical portion extends from one end of the cylindrical portion. A thickened portion is provided around the conical portion in an enlarged end. A recess for engaging with the automobile body is provided on the outer peripheral surface of the thickened portion. A first side wall of the recess in the enlarged end extends outwardly, and a lip projects from a tip of the first side wall. A bottom surface of the recess has one of a curved portion and an inclined portion so that an edge of the through hole is forcefully pressed into and distorts the curved or inclined portion. A second side wall of the recess faces the first side wall and is formed so as to approach the first side wall along a direction from the bottom surface to an opening end of the recess. Thus, the automobile body panel, which engages with the inner surface of the recess of the grommet of the present invention, contacts the curved portion or inclined portion of the recess and the second side wall, as well as the lip As described above, the bottom surface of the recess configured to be engaged with the automobile body has a curved or inclined portion, and the edge of the through hole is forcefully pressed into and distorts the curved or inclined portion. Therefore, even if the grommet is pulled in a direction such that the inner peripheral edge of the through hole is separated from the bottom surface of the recess, the inner peripheral edge of the through hole engages and remains in contact with the curved or inclined surface. Further, since the side wall that faces the lip-side side wall is formed so as to approach the lip-side side wall, the automobile body panel is pressed by the lip and contacts the side wall that faces the lip-side side wall. Accordingly, together with the contact between the lip and the automobile body panel, the grommet and the automobile body panel remain in contact with each other at three points.

When the grommet is strongly pulled and sharply bent, the side wall that faces the lip-side side wall may be pulled in the bending direction and may be separated from the automobile body panel. Even in that case, since the bottom surface of the recess is curved or inclined in a V-shape, and the inner peripheral edge of the through hole is forcefully pressed into and distorts the curved or inclined bottom surface, the contact therebetween is maintained. Thus, together with the contact by the lip, at least two contact points are ensured. Accordingly, unlike the prior art device, since there is no chance for the grommet of the present invention to contact with the automobile body panel at only one contact point, seal efficiency is improved compared with the prior art device.

In accordance with another aspect of the present invention, the lip projects in a direction toward the cylindrical portion side and the lip projects a distance greater than a width between the first and second side walls at the opening end of the recess. Accordingly, the lip presses the automobile body panel more forcefully toward the cylindrical portion side, and thus, the contact between the lip and the automobile body is ensured.

According to a further aspect of the present invention, a maximum width of a gap between the first side wall and the second side wall is at least as large as the panel thickness of the automobile body panel so that the grommet can be used with an automobile body panel having a variety of panel thickness.

According to another aspect of the present invention, a width of a gap between the first side wall and the second side wall at the opening end of the recess is at least as large as the panel thickness of the automobile body panel. Accordingly, the opening end of the recess firmly contacts the automobile body panel.

In another aspect of the present invention, a diameter of the grommet around the bottom surface of the recess is at least as great as a diameter of the through hole. Accordingly, the edge of the through hole firmly engages with the bottom surface.

In accordance with a further aspect of the present invention, one of the curved portion and the inclined portion is provided in a side of the second side wall on the bottom surface of the recess. One of the curved portion and the inclined portion can also be provided in both sides of the first and second side walls on the bottom surface of the recess.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1A:
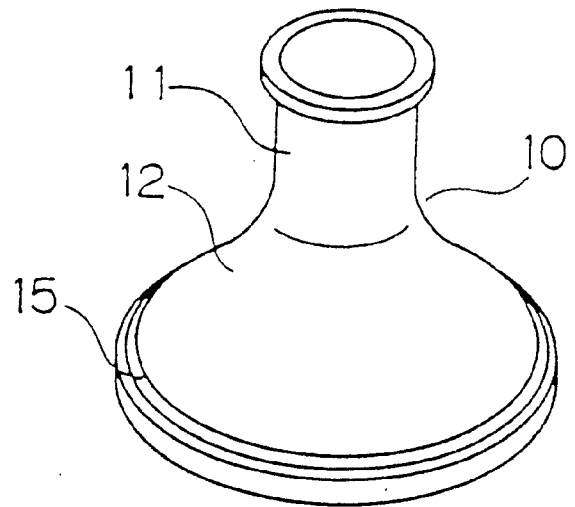
FIGS. 1(A) and 1(B), respectively, show a perspective view and an enlarged cross-sectional view of a main portion of a grommet of a first embodiment according to the present invention.
Figure 1B:
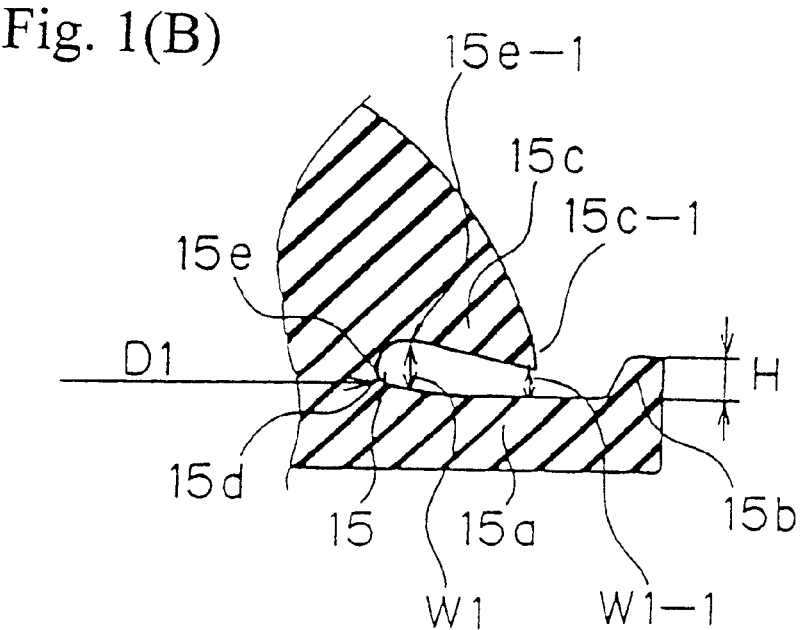

Embodiments of the present invention are explained in the following with reference to figures.

FIGS. 1(A) through 4 illustrate a first embodiment of the present invention. Grommet 10 is made of a rubber or any suitable elastomeric material. The basic shape of the grommet 10 is the same as the conventional grommet except for the recess 15 that engages with an automobile body. The grommet 10 is provided with a small-diameter cylindrical portion 11, which tightly covers an outer periphery of a wire harness, a generally conical (convex) portion 12, which continuously extends from an end of the small-diameter cylindrical portion 11. The enlarged end of the conical portion 12 has a thickened portion. The outer peripheral surface of the thickened portion includes the recess 15 for engaging with an automobile body.

The side wall 15a of the recess 15 at the enlarged end of the grommet extends outwardly in a direction of the diameter. Another side wall 15c faces toward the side wall 15a. A lip 15b projects from a tip of the extending sidewall 15a in a direction opposite to the enlarged end. The lip 15b has a height H that is greater than a width W1-1 between the side walls 15a and 15c at an opening edge 15c-1. In this embodiment, the height H is set at about 1 mm, but the height H may have any suitable dimension.

Width W1, which is the maximum width between the facing side walls 15a and 15c of the recess 15, is defined to be at least as great as the panel thickness W2 of the automobile body panel. Therefore, the grommet 10 can be used with an automobile body panel having a variety of panel thicknesses W2. In this embodiment, the width W1 of the recess 15 is defined so that the grommet can be used with an automobile body panel having a panel thickness W2 of about 0.6 mm to about 1.0 mm.

The bottom surface 15d of the recess 15 has a curved portion 15e. At the point of the outer edge 15e-1 of the curved portion 15e, the width W1 between the side walls 15a and 15c is set to be about 1 mm, which corresponds to the maximum panel thickness 1 mm in this embodiment. The curved portion 15e is provided at least on the side wall 15c side. The curved portion 15e does not need to be provided on the side wall 15a side.

Further, the side wall 15c is formed so as to gradually approach the side wall 15a along the direction from the outer edge 15e-1 of the curved portion 15e to the opening edge 15c-1 of the side wall 15c. At the opening edge 15c-1, the width W1-1 between the side walls 15a and 15c is set, for example, to be about 0.6 mm, which is smaller than W1.

Further, diameter D1 of the grommet around the bottom surface 15d of the recess 15 formed around the outer periphery of the grommet is defined as D2 plus 0 mm to 0.3 mm. D2 is a diameter of the through hole 2a of the automobile body panel 2. The diameter D1 of the grommet around the bottom surface 5d of the recess 15 is not smaller than the diameter D2 of the through hole 2a. Thus, the diameter D1 is defined as being slightly larger than the diameter D2. In this embodiment, the diameter D2 of the through hole 2a is set to be about 56 mm, and the diameter D1 of the grommet around the bottom surface of the recess is set to be about 56 mm plus 0 mm to 0.3 mm.

The wire harness W/H is inserted into the grommet 10 that is formed to have the above-described shape. A group of wires of the wire harness is inserted into the small-diameter cylindrical portion 11 and tightly covered by the small-diameter cylindrical portion 11. One end of the small-diameter cylindrical portion 11 is fixed to the wire harness by taping.

As described above and shown in FIG. 2(A), the wire harness W/H having the grommet 10 mounted thereon is inserted into the through hole 2a of the automobile body panel 2 that divides an engine compartment and a passenger compartment, such that the grommet is inserted from the conical portion 12. While inserting, the side wall 15a of the recess 15 in the enlarged end of the conical portion 12 is deformed and passes through the through hole 2a. Then, the inner peripheral edge portion of the through hole 2a engages with the inner surface of the recess 15 so that the grommet 10 is fixed to the automobile body panel 2.

Since the recess 15 has the curved portion 15e on the bottom surface 15d and the width W1-1 between the side walls of the recess at the opening edge 15c-1 is smaller than the panel thickness (1 mm) of the automobile body panel 2, the through hole 2a is engaged with the recess 15 such that the inner peripheral edge 2a-1 of the through hole 2a firmly presses into and distorts the curved portion 15e of the recess 15. Further, the passenger compartment side surface 2b of the automobile body panel contacts the tip of the lip 15b and is pressed toward the engine compartment side by the lip 15b. In addition, the side wall 15c is formed so as to approach the side wall 15a along the direction from the bottom surface 15d to the opening edge 15c-1. Thus; at the opening edge 15c-1, the width between side walls 15a and 15c is set to be about 0.6 mm, which is smaller than the panel thickness (1 mm) of the automobile body panel 2. Accordingly, the engine compartment side surface 2c of the automobile body panel 2 presses against the opening edge 15c-1 of the side wall 15c of the recess 15.

Figure 2A:
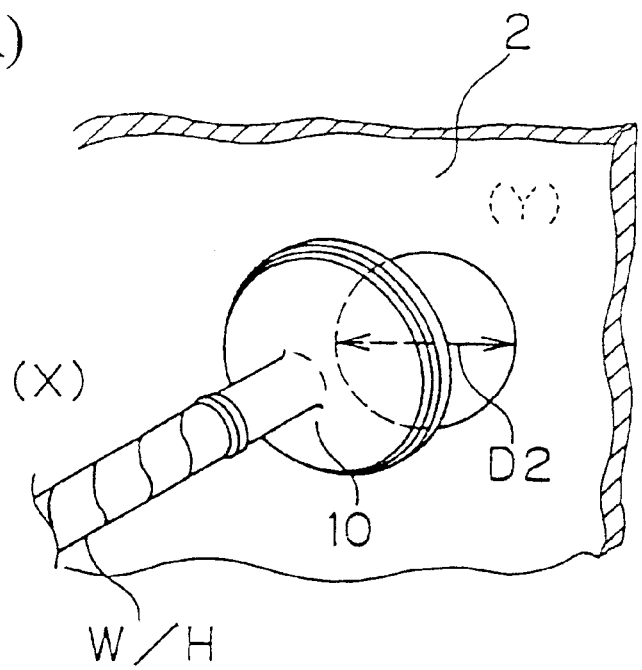
FIG. 2(A) is a perspective view illustrating a condition when the grommet according to the first embodiment is mounted on a wire harness and is being inserted into an automobile body panel.
Figure 2B:
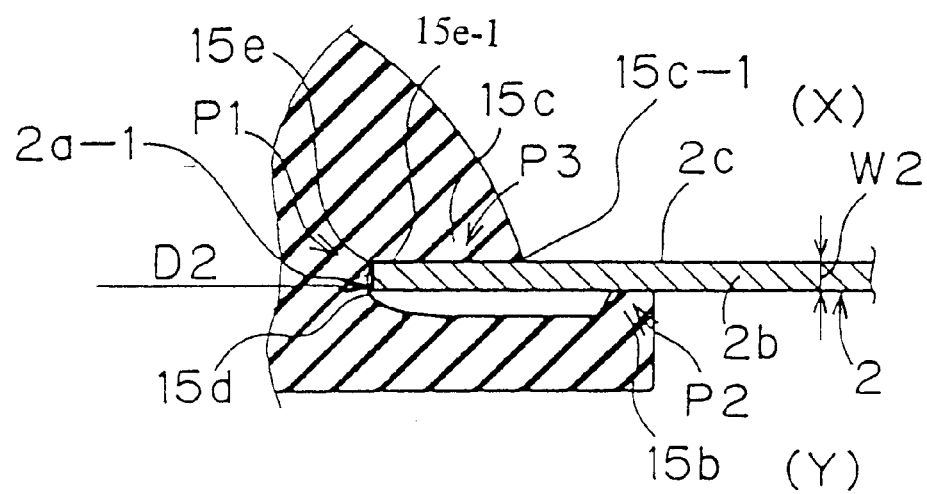
FIG. 2(B) is a cross-sectional view illustrating a condition when the grommet is mounted on the automobile body panel according to the first embodiment.

Thus, the automobile body panel 2 contacts the grommet totally at three points P1, P2 and P3 as shown in FIG. 2(B). P1 is a point where the inner peripheral edge 2a-1 of the through hole 2 is firmly pressed into and distorts the curved portion 15e on the bottom surface of the recess. P2 is a point where the lip 15b is pressed against the passenger compartment side surface 2b of the automobile body panel 2. P3 is a point where the opening edge 15c-1 of the side wall 15c contacts the engine compartment side surface 2c of the automobile body panel 2.

Figure 3A:
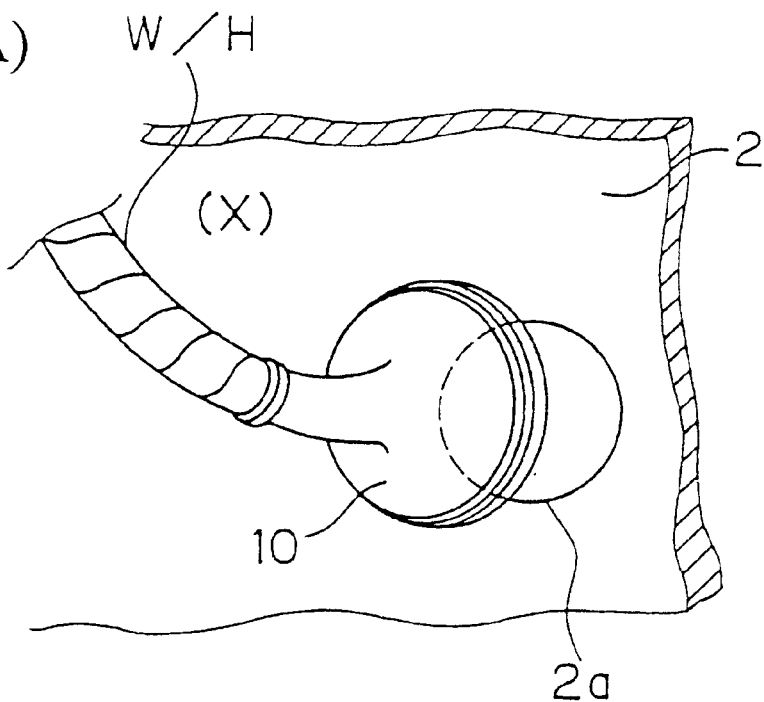
FIGS. 3(A) and 3(B), respectively, show a perspective view illustrating a bent wire harness, and an enlarged cross-sectional view of a main portion of the grommet according to the first embodiment of the present invention.
Figure 3B:
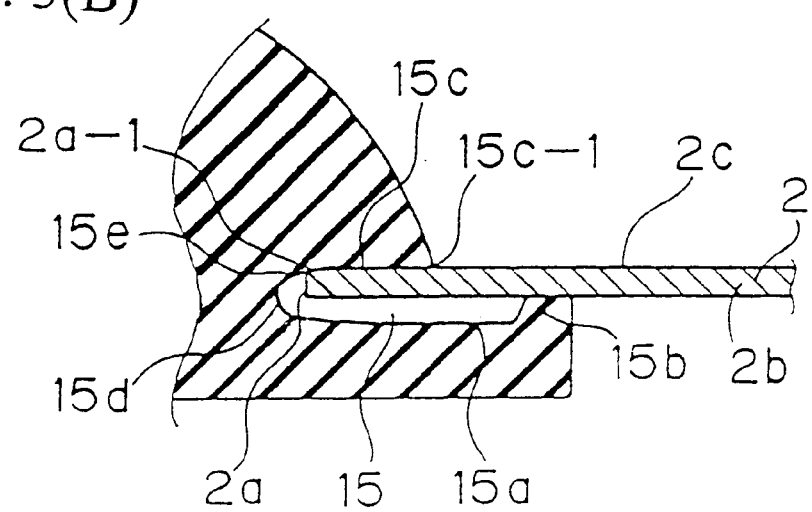

As shown in FIGS. 3(A) and 3(B), when the grommet connected to the wire harness W/H is bent at the engine compartment side (X), the recess 15 positioned opposite to the bending direction is pulled in the bending direction, i.e., in the direction that the bottom surface 15d of the recess is tending to be separated from the through hole 2a. However, since curved portion 15e is provided, the edge 2a-1 of the through hole 2a stays firmly pressed into and engaged with the curved portion 15e. Thus, the inner peripheral edge 2a-1 of the through hole 2a remains in contact with and does not become separated from the curved portion 15e of the recess 15.

Further, the lip 15b is also pulled toward the engine compartment side. However, since the tip of the lip 15b contacts the passenger compartment side surface 2b of the automobile body panel 2, the lip 15b is more firmly pressed into contact with the automobile body panel 2. In addition, since, at the opening edge 15c-1, the gap width between the side walls 15a and 15c is smaller than the panel thickness of the automobile body panel, even if the side wall 15c is pulled somewhat in a direction to become separated from the automobile body panel, the side wall 15c and the automobile body panel remain in contact with each other. Accordingly, the automobile body panel 2 and grommet 10 maintain contact with one another at three points; therefore, water intrusion is completely prevented.

Figure 4:
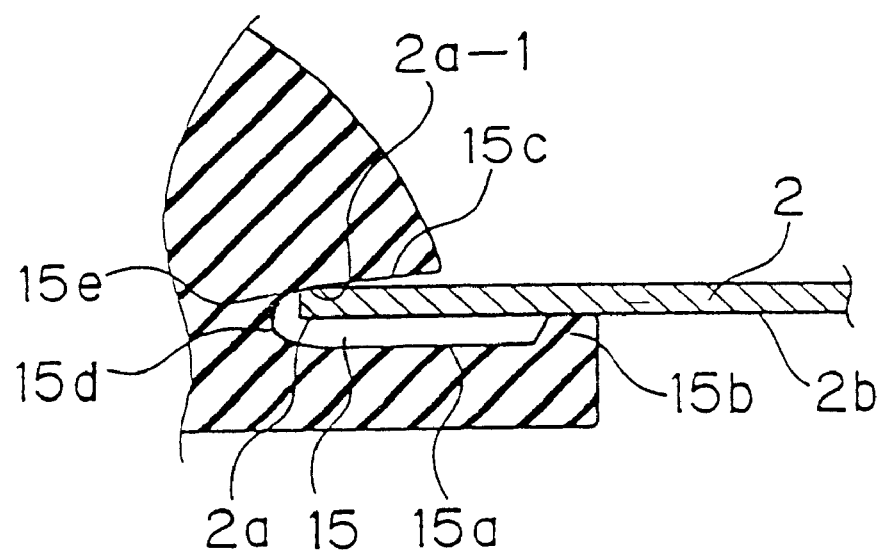
FIG. 4 is an enlarged cross-sectional view of the main portion of the grommet according to the first embodiment when the wire harness is sharply bent.

When the wire harness is sharply bent and the grommet is also bent sharply, as shown in FIG. 4, the side wall 15c of the recess may become separated from the engine compartment side surface 2c of the automobile body panel 2. However, the inner peripheral edge 2a-1 remains firmly pressed into and engaged with the curved portion 15e on the bottom surface of the recess. In addition, lip 15b is more firmly pressed into contact with the passenger compartment side surface 2b of the automobile body panel. Thus, even in the worst case, two sealing points are ensured and water intrusion is prevented.

Figure 5A:
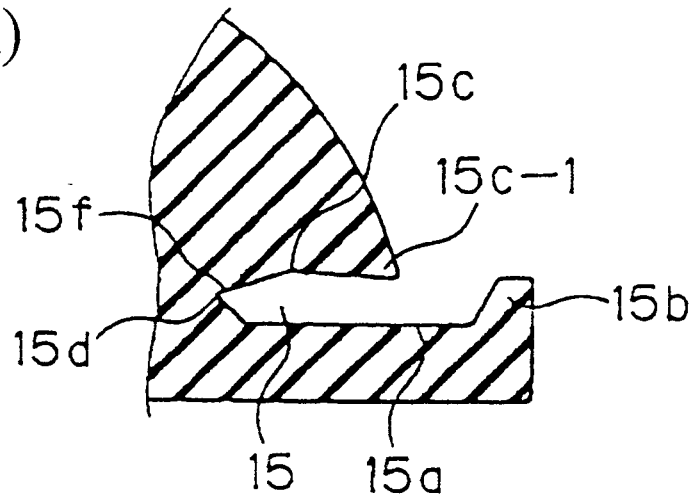
FIGS. 5(A) and 5(B) show cross-sectional views of the main portion of the grommet according to the second embodiment of the present invention.
Figure 5B:
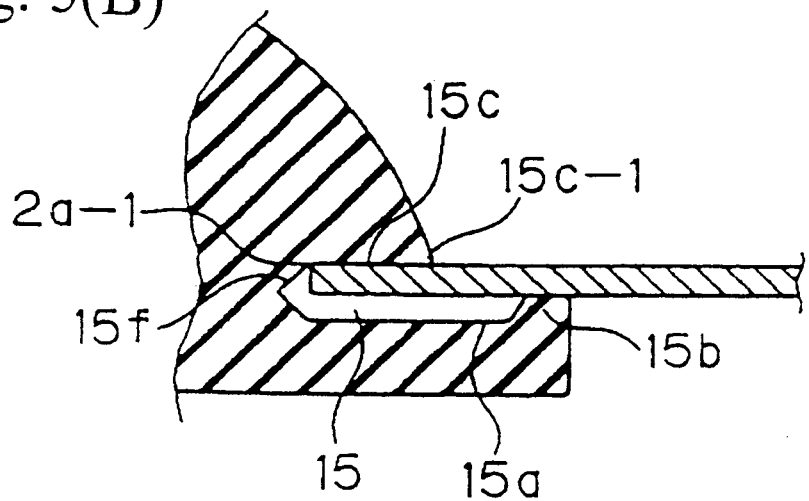
Figure 6A:
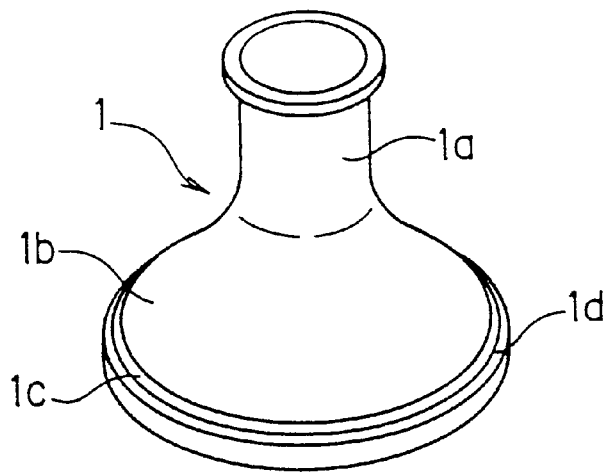
FIGS. 6(A), 6(B) and 6(C), respectively, show a perspective view of a conventional grommet, an enlarged cross-sectional view of the main portion the grommet, and an enlarged cross-sectional view of the main portion of the grommet when it is engaged with an automobile body panel.
Figure 6B:
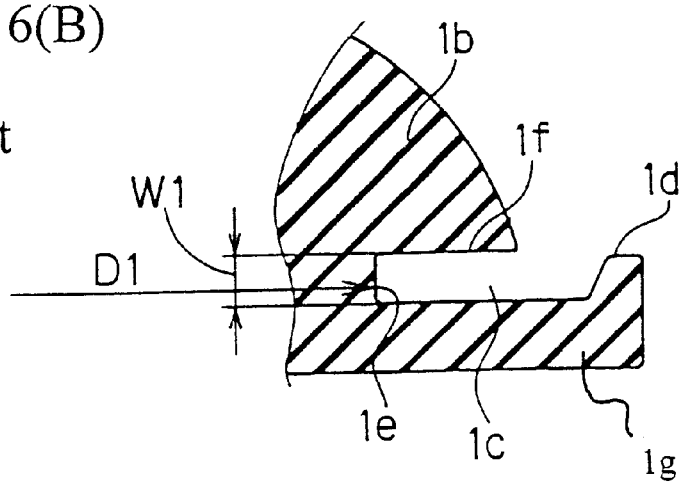
Figure 6C:
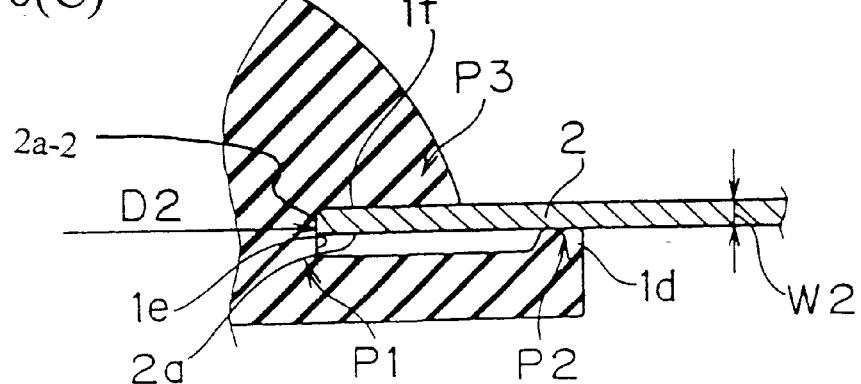
Figure 7:
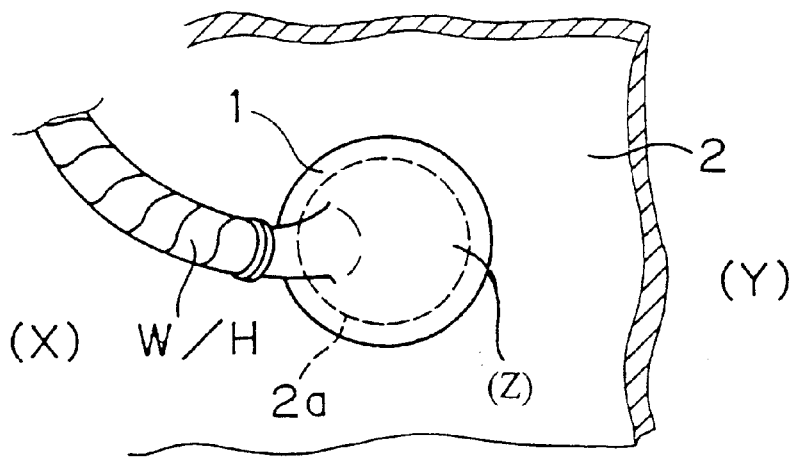
FIG. 7 shows a perspective view of a bent wire harness fitted with the conventional grommet.
Figure 8:
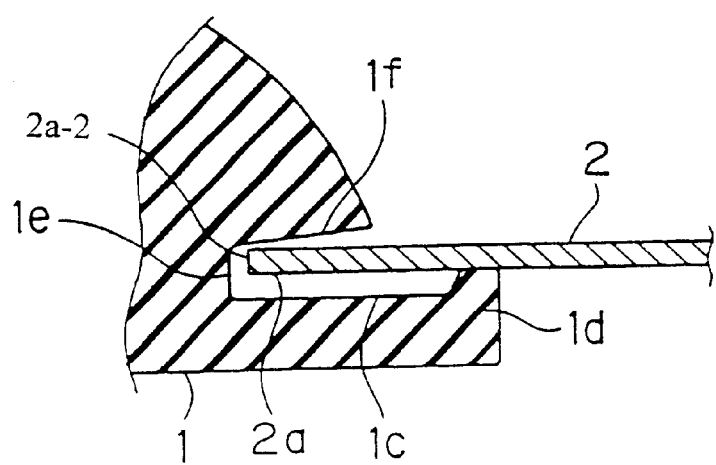
FIG. 8 shows an enlarged cross-sectional view of the bent wire harness to explain a problem thereof.

FIGS. 5(A) and 5(B) show a second embodiment of the present invention, in which a V-shaped inclined portion 15f is provided on the bottom surface 15d of the recess, instead of the curved portion 15e. In FIG. 5(A), the inclination is provided only on the side of side wall 15c. In FIG. 5(B), the inclined portion is provided on both sides of the side walls 15c and 15a.

When the inclined portion 5f is provided on the bottom surface 15d of the recess 15 as shown in the second embodiment, the edge 2a-1 of the through hole 2a is firmly pressed into and distorts the inclined portion 15f, similar to the first embodiment. Thus, even if the grommet 10 is deformed by the bent wire harness, the grommet 2 maintains contact with the edge of the through hole of the automobile body panel 2.

As clearly explained above, according to the present invention, when a through hole of the automobile body panel does not have a burring, and a lip provided on a grommet mainly seals a gap between the grommet and the automobile body panel, the bottom surface of the recess for engaging with the automobile body is curved or inclined to form V-shape. Therefore, the edge of the through hole of the automobile body panel can be firmly pressed into and distorts the curved or the inclined portion of the recess. Accordingly, when a wire harness fixed to the grommet is bent and consequently the grommet mounted on the automobile body panel is deformed, the bottom surface of the recess for engaging with the automobile body maintains contact with the edge of the through hole. In addition, since the side wall in the enlarged end of the generally conical portion extends outwardly and the lip is provided at the tip of the extending side wall, even if the grommet is deformed, the lip presses more firmly against and thus ensures contact with the automobile body panel As a result, even if the wire harness is sharply bent and grommet is severely deformed, at least two seal points are secured between the grommet and automobile body panel.

Further, a side wall that faces toward the side wall having the lip is formed so as to approach the lip-side side wall along the direction from the bottom surface of the recess to the opening edge of the recess. The gap between side walls at the opening edge is defined to be slightly smaller than the panel thickness of the automobile body panel. Accordingly, even if the grommet is deformed by the bent wire harness, the side wall remains in contact with the automobile body panel.

As described above, unlike the conventional grommet, which contacts the automobile body panel only at one contact point of the lip, the grommet of the present invention is formed so as to have at least two contact points, or three in a normal condition. Accordingly, waterproofness of the grommet assembly is improved.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. HEI 11- 54703, filed on Mar. 2, 1999, which is herein expressly incorporated by reference in its entirety.

What is claimed is:

1. A grommet configured to be engaged around an outer periphery of a wire harness and to be mounted in a through hole of an automobile body panel without burring, said grommet comprising:

a generally cylindrical portion that tightly engages a wire of the wire harness;

a generally conical portion extending from one end of said cylindrical portion;

a thickened portion provided around said conical portion in an enlarged end;

a recess configured to be engaged with the automobile body panel, said recess provided on an outer peripheral surface of said thickened portion;

a first side wall of said recess positioned in said enlarged end and extending outwardly;

a lip projecting from a tip of said first side wall, so that one surface of the automobile body panel firmly presses against and engages with said lip;

a second side wall of said recess that faces said first side wall, said second side wall configured to approach said first side wall along a direction from an innermost surface to an opening end of said recess, so that the other surface of the automobile panel firmly presses against and engages with an opening edge of said second side wall; and one of a curved portion and an inclined portion extending continuously between said innermost surface of said recess and said second side wall and along a portion of said second side wall adjacent said innermost surface of said recess, so that an edge of the through hole firmly presses into and deforms said one of said curved portion and said inclined portion.

2. The grommet according to claim 1, wherein said lip projects in a direction toward the cylindrical portion side and said lip projects a distance greater than a width of a gap between said first side wall and said second side wall at said opening end of said recess so that said lip and said second side wall overlap each other.

3. The grommet according to claim 1, wherein a maximum width of a gap between said first side wall and said second side wall is at least as great as a panel thickness of the automobile body panel.

4. The grommet according to claim 1, wherein a width of a gap between said first side wall and said second side wall at said opening end of the recess is smaller than a panel thickness of the automobile body panel.

5. The grommet according to claim 1, wherein a diameter of said grommet around said innermost surface of said recess is at least as great as a diameter of the through hole.

6. The grommet according to claim 1, further comprising a second one of said curved portion and said inclined portion extending between said innermost surface of said recess and said first side wall.

7. A grommet configured to be engaged around an outer periphery of a wire harness and to be mounted on a through hole of an automobile body panel, said grommet comprising:

a generally cylindrical portion that tightly engages a wire of the wire harness;

a generally conical portion extending from one end of said cylindrical portion;

a thickened portion provided around said conical portion in an enlarged end;

a recess configured to be engaged with the automobile body panel, said recess provided on an outer peripheral surface of said thickened portion;

a first side wall of said recess positioned in said enlarged end and extending outwardly;

a lip projecting from a tip of said first side wall;

a second side wall of said recess that faces said first side wall; and one of a curved portion and an inclined portion extending continuously between an innermost surface of said recess and said second side wall and along a portion of said second side wall adjacent said innermost surface of said recess;

wherein said second side wall is configured to approach said first side wall along a direction from an outer edge of said one of said curved portion and said inclined portion to an opening edge of said second side wall, so that an edge of the through hole firmly presses into and deforms said one of said curved portion and said inclined portion, and so that a surface of the automobile body panel firmly presses against and engages with said opening edge of said second side wall.

8. The grommet according to claim 7, wherein said lip projects in a direction toward the cylindrical portion side and said lip projects a distance greater than a width of a gap between said first side wall and said second side wall at said opening end of said recess so that said lip and said second side wall overlap each other.

9. The grommet according to claim 7, wherein a diameter of said grommet around said innermost surface of said recess is at least as great as a diameter of the through hole.

10. The grommet according to claim 7, wherein a maximum width of a gap between said first side wall and said second side wall is at least as great as a panel thickness of the automobile body panel.

11. The grommet according to claim 7, wherein a width of a gap between said first side wall and said second side wall at said opening end of said recess is smaller than a panel thickness of the automobile body panel.

12. The grommet according to claim 7, further comprising a second one of said curved portion and said inclined portion extending between said innermost surface of said recess and said first side wall.

13. A grommet configured to be engaged around an outer periphery of a wire harness and to be mounted in a through hole of an automobile body panel, said grommet comprising:

a generally cylindrical portion that tightly covers a wire of the wire harness;

a generally conical portion extending from one end of said cylindrical portion;

a thickened portion provided around said conical portion in an enlarged end;

a recess configured to be engaged with the automobile body panel, said recess provided on an outer peripheral surface of said thickened portion;

a first side wall of said recess positioned in said enlarged end and extending outwardly;

a lip projecting from a tip of said first side wall; and a second side wall of said recess that faces said first side wall, said second side wall configured to approach said first side wall along a direction from an innermost surface of said recess to an opening end of said recess, wherein said lip projects in a direction toward said cylindrical portion side and a distance greater than a width of a gap between said first side wall and said second side wall at said opening end of said recess so that said lip and an opening edge of said second side wall overlap each other in an uninstalled condition of said grommet, whereby the automobile body panel is tightly engaged between said lip and said opening edge of said second side wall in an installed condition of said grommet.

14. The grommet according to claim 13, wherein a diameter of said grommet around said innermost surface of said recess is at least as great as a diameter of the through hole.

15. The grommet according to claim 13, wherein a maximum width of a gap between said first side wall and said second side wall is at least as great as a panel thickness of the automobile body panel.

16. The grommet according to claim 13, wherein a width of a gap between said first side wall and said second side wall at said opening end of said recess is smaller than a panel thickness of the automobile body panel.

\* \* \* \* \*